US012639253B1

(12) United States Patent
Ankit et al.

(10) Patent No.: US 12,639,253 B1
(45) Date of Patent: May 26, 2026

(54) METHODS AND SYSTEMS FOR ALLREDUCE OPTIMIZATION ON SMALL TENSORS

(71) Applicant: d-MATRIX CORPORATION, Santa Clara, CA (US)

(72) Inventors: Aayush Ankit, Santa Clara, CA (US); Sudeep Bhoja, Santa Clara, CA (US)

(73) Assignee: d-MATRIX CORPORATION, Santa Clara, CA (US)

( * ) Notice: Subject to any disclaimer, the term of this patent is extended or adjusted under 35 U.S.C. 154(b) by 56 days.

(21) Appl. No.: 18/985,890

(22) Filed: Dec. 18, 2024

(51) Int. Cl.
| | |
|---|---|
| *G06F 15/173* | (2006.01) |
| *G06F 13/40* | (2006.01) |
| *G06F 13/42* | (2006.01) |
| *G06F 15/78* | (2006.01) |
| *G06N 3/04* | (2023.01) |

(52) U.S. Cl.
CPC .... *G06F 15/17318* (2013.01); *G06F 13/4004* (2013.01); *G06F 13/4282* (2013.01); *G06F 15/7807* (2013.01); *G06N 3/04* (2013.01); *G06F 2213/0026* (2013.01)

(58) Field of Classification Search
CPC .......... G06F 15/17318; G06F 13/4004; G06F 13/4282; G06F 15/7807; G06F 2213/0026; G06N 3/04
See application file for complete search history.

(56) References Cited

U.S. PATENT DOCUMENTS

| | | | |
|---|---|---|---|
| 12,189,569 B1 * | 1/2025 | Xu ..................... | G06F 15/17318 |
| 2021/0311808 A1 * | 10/2021 | Cevolani .......... | G06F 15/17318 |
| 2023/0058355 A1 | 2/2023 | Hornung et al. | |
| 2023/0359582 A1 * | 11/2023 | Kashyap .............. | H04L 47/193 |
| 2024/0037379 A1 * | 2/2024 | Balachandran ......... | G06F 1/324 |
| 2024/0205133 A1 * | 6/2024 | Clark .................. | H04L 41/0823 |
| 2025/0077468 A1 * | 3/2025 | Jin ...................... | G06F 13/4004 |
| 2025/0335374 A1 * | 10/2025 | Bhoja ........................ | G06F 1/10 |
| 2025/0358018 A1 * | 11/2025 | Thyagaturu .......... | H04B 10/801 |
| 2026/0046317 A1 * | 2/2026 | Crabtree ............... | H04L 63/104 |
| 2026/0056891 A1 * | 2/2026 | Bhoja ........................ | G06F 1/10 |

OTHER PUBLICATIONS

Smith, Ryan, "d-Matrix Corsair In-Memory Computing for AI Inference at Hot Chips 2025", Aug. 26, 2025, https://www.servethehome.com/d-matrix-corsair-in-memory-computing-for-ai-inference-at-hot-chips-2025/ (Year: 2025).*

GSA Global, "Heterogeneous Integration—Chiplets", Feb. 2023, https://www.gsaglobal.org/wp-content/uploads/2023/02/2022-IPIG-Heterogenous-Integration-Chiplets-White-Paper-Final-v4.pdf (Year: 2023).*

(Continued)

*Primary Examiner* — Ramy M Osman

(74) *Attorney, Agent, or Firm* — Richard T. Ogawa; Ogawa P.C.

(57) ABSTRACT

Methods and systems for allreduce optimization on small tensors. In an embodiment, the present invention provides a system for hierarchical data aggregation includes a first module with interconnected chiplets linked via D2D links, enabling intra-module data sharing and reduce-scatter operations. A second module, also with interconnected chiplets and D2D links, performs a similar intra-module reduce-scatter operation. There are other embodiments as well.

18 Claims, 7 Drawing Sheets

(56)            References Cited

OTHER PUBLICATIONS

Huang et al., "Hecaton: Training and Finetuning Large Language Models with Scalable Chiplet Systems", Jul. 8, 2024, https://arxiv.org/pdf/2407.05784v1 (Year: 2024).*

Huang et al., "Hecaton: Training Large Language Models with Scalable Waferscale Chiplet Systems", Nov. 27, 2024, https://arxiv.org/pdf/2407.05784v2 (Year: 2024).*

Won, Lewis, "From Scatter to All-Reduce: A Plain-English Guide to Collective Operations", Jul. 25, 2025, https://dev.to/lewis_won/from-scatter-to-all-reduce-a-plain-english-guide-to-collective-operations-1695 (Year: 2025).*

* cited by examiner

METHODS AND SYSTEMS FOR ALLREDUCE OPTIMIZATION ON SMALL TENSORS

BACKGROUND OF THE INVENTION

The present invention relates generally to integrated circuit (IC) devices and artificial intelligence (AI). More specifically, the present invention provides to methods and systems for accelerating computing workloads in transformer-based models (a.k.a. transformers), with a particular focus on the importance of memory testing in AI chips used for natural language processing (NLP) training.

Transformers have emerged as the dominant neural network architecture in the natural language processing (NLP) field, with their influence rapidly extending into other areas of machine learning. The original Transformer architecture, introduced in the seminal paper "Attention is All You Need" (Vaswani et al., 2017), revolutionized the field by leveraging a self-attention mechanism that eschews recursion and facilitates parallelism, enabling more efficient processing of complex data. This architectural innovation has given rise to numerous transformer model variants, including the Generative Pre-trained Transformer (GPT) and the Bidirectional Encoder Representations from Transformers (BERT) models. These models have demonstrated significant superiority over previous architectures in inference tasks, largely due to their ability to handle large-scale data with enhanced parallel processing capabilities. However, this has come at the cost of increased computational intensity and substantial memory demands, often resulting in time-intensive and inefficient training processes.

In recent years, NLP models have expanded exponentially in both size and computational requirements. For instance, training a model like GPT-3, which contains 175 billion parameters, can require approximately four months of continuous operation on 1,024 graphics processing units (GPUs). As the development of new NLP models accelerates, models with trillions of parameters are already being realized, and multi-trillion parameter models are on the horizon. This rapid growth has presented significant challenges in scaling NLP models for practical deployment, especially computations involving allreduce operations.

For example, an allreduce operation is a data processing technique used in parallel computing systems to efficiently aggregate data across multiple processing units, such as chiplets, modules, or devices. The operation involves two primary phases: a reduce phase and a broadcast (or allgather) phase. In the reduce phase, partial results from each processing unit are aggregated according to a specified operation, such as summation, averaging, or finding maximum values. For example, a reduce-scatter operation is a collective communication process used in parallel and distributed computing to combine data across multiple processing units, such as chiplets, GPUs, or nodes, and then distribute the partial results back to each unit. It is often used as part of allreduce operations in applications like machine learning and high-performance computing. The reduce-scatter operation involves reduction and scattering. In reduction, each processing unit contributes a portion of its data, which is aggregated with data from other units according to a specified operation, such as addition, multiplication, or averaging. This aggregation is typically done in a hierarchical or ring-based structure to optimize efficiency. Scattering is performed after the reduction, where the aggregated results are divided (scattered) so that each processing unit receives only a portion of the final result, specifically the portion it needs for subsequent processing. In the broadcast phase, the aggregated result is shared with each participating processing unit, so each unit has access to the same final result. Allreduce operations are commonly used in large-scale data processing environments, such as those supporting AI and ML applications, to synchronize model parameters, aggregate intermediate results, or manage distributed data across a network of processing units.

Over the past, various techniques have been proposed, but they are inadequate. New and improved systems and methods are desired.

BRIEF SUMMARY OF THE INVENTION

Methods and systems for allreduce optimization on small tensors. In an embodiment, the present invention provides a system for hierarchical data aggregation includes a first module with interconnected chiplets linked via D2D links, enabling intra-module data sharing and reduce-scatter operations. A second module, also with interconnected chiplets and D2D links, performs a similar intra-module reduce-scatter operation. There are other embodiments as well.

Embodiments of this application discloses a system for performing hierarchical data aggregation operations, specifically reduce-scatter and allgather operations, across a multi-module, multi-chiplet setup. The system includes a first module containing multiple interconnected chiplets linked via D2D connections, as well as a second module with a similar configuration of chiplets and D2D links. These D2D links enable high-speed, intra-module communication for sharing data and performing reduce-scatter operations on localized data sets within each module.

In certain embodiments, the modules operate independently within their respective configurations, using fully connected D2D links to conduct initial data aggregation (reduce-scatter) operations. Following these operations, data precision can be scaled down, optimizing the amount of data transmitted during inter-module communications. Precision scaling enables the allgather operations—carried out between modules via a peripheral component interconnect express (PCIe) link—to utilize bandwidth efficiently by reducing data size. This PCIe connection supports both reduce-scatter and allgather operations across modules, thus facilitating comprehensive data aggregation across the system.

Some embodiments include features such as MCM) configurations, wherein each module's chiplets are arranged in a fully connected mesh topology. Some configurations include additional PCIe links that enable cross-module chiplet connections for broader flexibility in data sharing and aggregation pathways. Additionally, synchronization controllers are employed to coordinate the timing of operations across modules and chiplets, enhancing the precision and efficiency of data exchanges.

In an embodiment, the present invention provides a method for allreduce operations, with the option to adjust the precision of data following the initial intra-module reduce-scatter phase. Precision scaling reduces data size before the allgather operation, conserving bandwidth and enabling efficient inter-module communication. There are other embodiments as well.

DETAILED DESCRIPTION OF THE INVENTION

Figure 1:
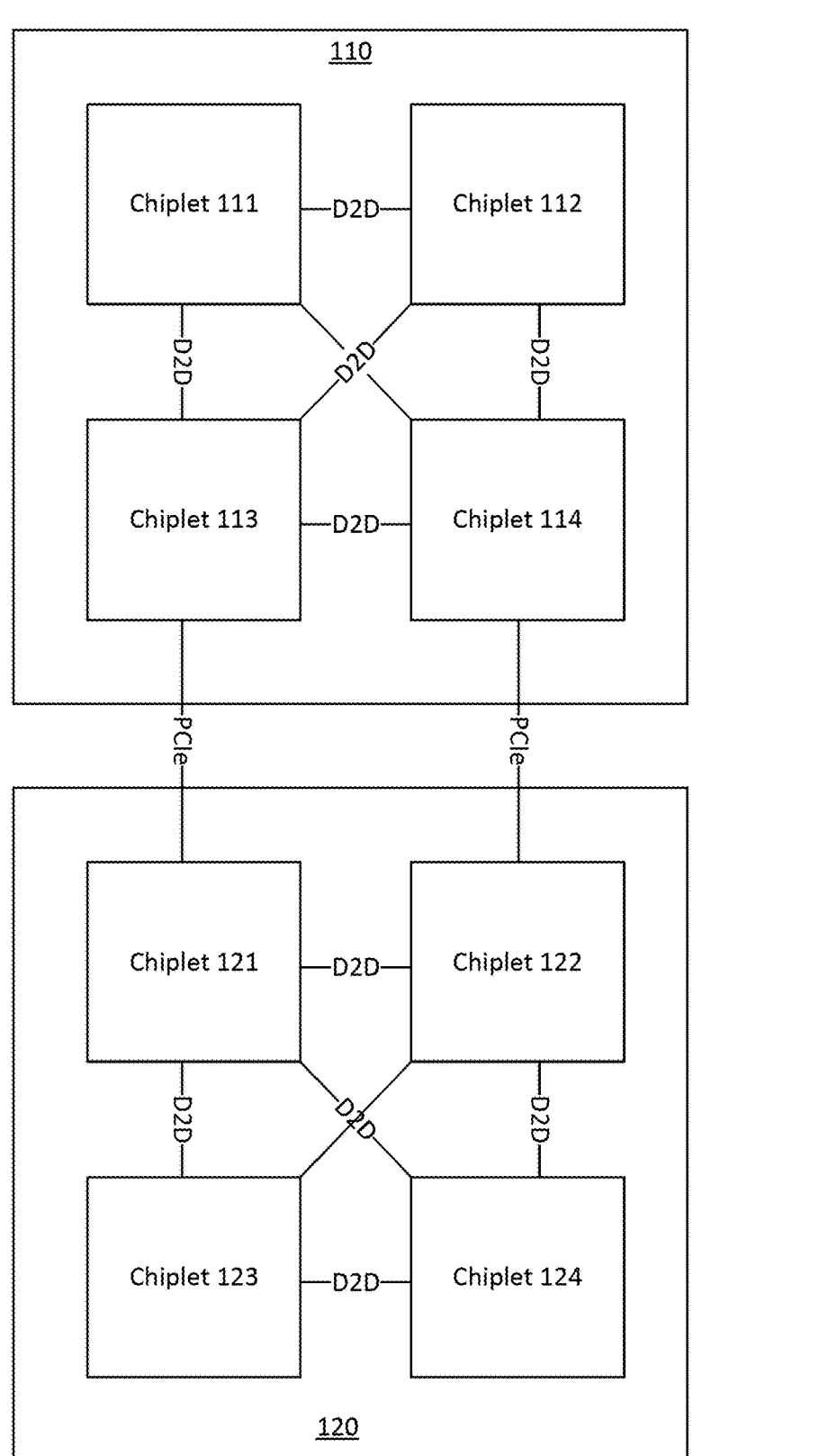
FIG. 1 is a simplified block diagram illustrating system 100 configured to perform allreduce operations according to embodiments of the present invention.

Methods and systems for allreduce optimization on small tensors. In an embodiment, the present invention provides a system for hierarchical data aggregation includes a first module with interconnected chiplets linked via D2D links, enabling intra-module data sharing and reduce-scatter operations. A second module, also with interconnected chiplets and D2D links, performs a similar intra-module reduce-scatter operation. There are other embodiments as well.

Existing methods for handling data aggregation across distributed modules and chiplets face limitations, particularly in achieving high-performance data sharing and aggregation with precision scaling to optimize bandwidth. Efficient AllReduce operations, including reduce-scatter and allgather processes, are critical for the scalability and performance of transformer-based models by allowing hierarchical data aggregation across modules. These methods reduce the amount of data transmitted during inter-module communication, conserve bandwidth, and allow for effective scaling in multi-chiplet and multi-module systems.

Despite ongoing advancements, current aggregation techniques do not adequately address the demands of multi-module, high-precision data processing required for scaling transformer models efficiently. It is to be appreciated that embodiments of the present invention provide improved systems and methods for high-speed, low-latency data aggregation with precision scaling across chiplets and modules, thereby enhancing the performance of AI models in large-scale applications.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

FIG. 1 is a simplified block diagram illustrating system 100 configured to perform allreduce operations according to embodiments of the present invention. This diagram is merely an example, which should not unduly limit the scope of the claims. One of ordinary skill in the art would recognize many variations, alternatives, and modifications. According to various embodiments, system 100 supports high-performance data exchange essential for AI and ML workloads by using interconnected chiplets within multiple modules, each capable of parallel processing and high-speed data sharing.

As an example, system 100 includes two modules: a first module 110 and a second module 120. Each module includes a plurality of chiplets configured in a fully connected topology to facilitate seamless data exchange. Specifically, first module 110 contains four chiplets, labeled as Chiplet 111, Chiplet 112, Chiplet 113, and Chiplet 114. Similarly, the second module 120 includes four chiplets, labeled as Chiplet 121, Chiplet 122, Chiplet 123, and Chiplet 124. These chiplets within each module are configured to execute parallel computations and participate in data aggregation operations, which are crucial for distributed processing in high-performance computing environments.

Within each module, the chiplets are interconnected through a series of die-to-die (D2D) links that provide high-bandwidth, low-latency connections for direct communication between chiplets. In various implementations, these D2D links enable intra-module data sharing, supporting essential data aggregation operations such as reduce-scatter and allgather. For example, in reduce-scatter operations, data may be aggregated across chiplets within each module, with each chiplet handling a specific portion of the data. In allgather operations, the aggregated data may be redistributed across the chiplets within the module, ensuring that each chiplet has access to the complete set of results. In various embodiments, each D2D link is optimized to support a uni-directional bandwidth of at least 64 GB/s with an approximate latency of 40 nanoseconds, allowing chiplets to exchange data efficiently within each module. These links may operate independently or be grouped together to increase available bandwidth as required by the data-intensive operations. In various embodiments, multiple D2D links may be configured between two chiplets for increased bandwidth.

To facilitate communication between the two modules, FIG. 1 also shows peripheral component interconnect express (PCIe) links connecting the first module 110 and the second module 120. These PCIe links provide high-speed inter-module communication, enabling inter-module reduce-scatter and allgather operations that span across the chiplets in both modules. The PCIe links are configured to handle substantial data transfers with sufficient bandwidth to accommodate aggregated data exchanges, enabling efficient hierarchical data processing across modules. By leveraging both D2D and PCIe links, the system achieves a balanced approach to intra-module and inter-module data communication, optimizing the flow of data during parallel processing tasks.

In an exemplary operation, system 100 performs hierarchical allreduce operations as follows. First, each module independently executes an intra-module reduce-scatter operation among its chiplets using the D2D links. During this phase, data is aggregated locally within each module. Optionally, precision scaling may be applied to the data following this reduce-scatter phase to reduce data size before inter-module transmission, thus conserving bandwidth during subsequent data exchanges. Following precision scaling, an inter-module allgather operation is performed using the PCIe links, distributing the aggregated data across both modules so that the final result is accessible to all chiplets in the system. This hierarchical configuration enables scalable and efficient data aggregation, which is critical for AI model training and other computationally intensive applications requiring distributed data handling and parallel processing capabilities.

Figure 2:
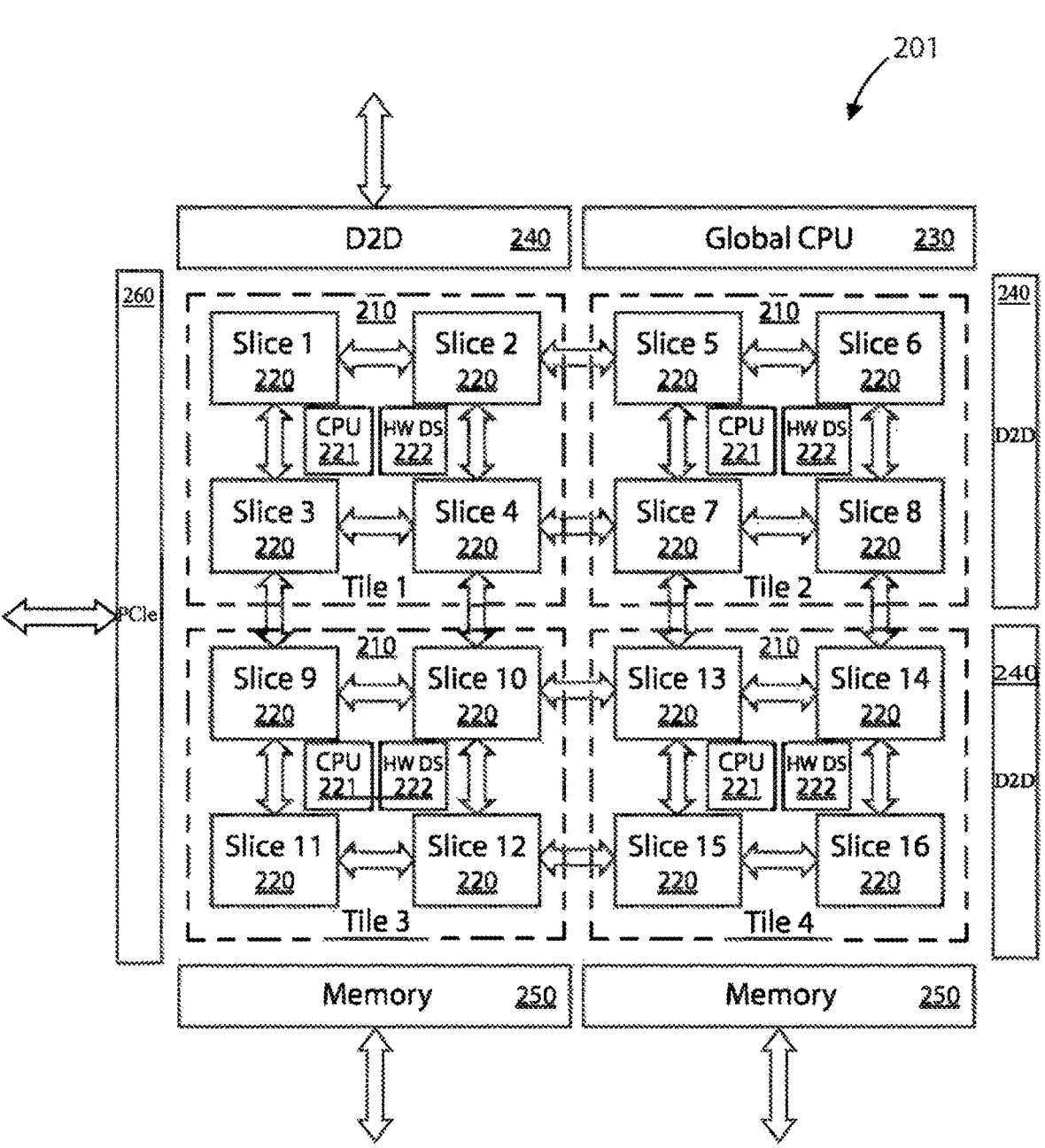
FIG. 2 is a simplified block diagram illustrating chiplet 201 configured to perform allreduce operations according to embodiments of the present invention.

FIG. 2 is a simplified block diagram illustrating chiplet device 201 configured to perform allreduce operations according to embodiments of the present invention. This diagram is merely an example, which should not unduly limit the scope of the claims. One of ordinary skill in the art would recognize many variations, alternatives, and modifications. As an example, chiplet device 201 is configured with a 16-slice architecture, specifically designed to support efficient dataflow management for AI accelerators. In this embodiment, the chiplet device 201 comprises four tiles, labeled as Tile 1, Tile 2, Tile 3, and Tile 4, arranged symmetrically within the chiplet. Each tile 210 contains four slices 220, which represent individual processing units. This architecture is optimized to execute complex operations, such as those involved in transformer-based models, by coordinating the execution of tasks across multiple slices and tiles, enabling efficient parallel processing and data sharing.

Each tile 210 is equipped with local CPU 221 and a hardware dispatch (HW DS) unit 222. CPU 221 in each tile coordinates the operations performed by slices 220 within that tile, ensuring that data dependencies are managed effectively. For example, CPU 221, which may be implemented as a reduced instruction set computer (RISC) processor or another type of lightweight processor, oversees the sequence of operations within the tile. HW DS unit 222 works in conjunction with CPU 221 to manage the control of slices 220, dynamically determining the sequence and allocation of resources for processing portions of computations, such as matrix multiplications or reduction operations. CPU 221 and HW DS 222 are configured to handle control and dataflow scheduling, facilitating the execution of compound operations that involve multiple stages of data processing, such as the allreduce operation which consists of reduce-scatter and allgather phases.

The device architecture further includes global CPU 230, which is coupled to each tile's CPU 221 via a global CPU interface. This interface may utilize buses, connectors, or sockets to enable inter-tile communication. Global CPU 230 coordinates processing across all tiles within the chiplet, managing interactions with other chiplets within a larger AI accelerator. Through its hierarchical organization, global CPU 230 directs the operation of each tile's CPU 221, leveraging HW DS 222 to distribute transformer computation workloads across slices within each tile. In larger AI accelerator architectures, global CPU 230 can oversee operations across multiple chiplets, each with similar tile and slice configurations.

Each slice 220 within the tiles is configured to execute a range of operations essential for AI workloads, such as matrix multiplications, element-wise computations, and collective operations, including gather, scatter, and reduce. The slices are interconnected within each tile through an inter-slice interconnect network, allowing for efficient data sharing and communication between slices. This network supports the execution of compound operations, where data generated by one slice can be transferred to adjacent slices or across tiles to be used in subsequent stages. The layout shown in FIG. 2, with tiles organized into groups, allows seamless dataflow within and between tiles, useful for reducing data movement latency and maximizing computational efficiency.

Chiplet device 201 includes several interfaces for data transfer and communication with external components. PCIe interface 260 provides a high-speed connection to external devices, such as servers or communication networks, enabling the chiplet to efficiently send and receive data. Additionally, the device is equipped with D2D interconnects 240 that facilitate data transfer either within the chiplet between tiles or between different chiplets in a larger AI accelerator configuration. These D2D interconnects are designed with high bandwidth and low latency, typically using single-ended signaling, to support the intensive data movement necessary for large-scale AI models, particularly in applications that require high-speed collective operations like allreduce.

Each tile 210 is also connected to one or more memory interfaces 250, which link the chiplet to external memory modules, such as DRAM. These memory interfaces provide the necessary bandwidth and capacity to store and retrieve input data, weight tensors, intermediate results, and output data. Efficient data movement between the memory modules and the chiplet is essential for executing large-scale AI models, such as GPT-3, which contain billions of parameters and require substantial memory resources for both training and inference. The memory interfaces 250 are configured to support high-speed data access, reducing bottlenecks in the flow of data during intensive computations.

In the execution of allreduce operations, such as a matrix multiplication followed by a reduction, the input data and weight matrices are first stored in memory and then transferred to the global buffer or register file (RF) as shown in the architecture. The slices in each tile execute the matrix multiplication operation independently and generate intermediate results, which are temporarily stored in the global buffer. These intermediate results are then transferred across slices and tiles through high-speed interconnects for subsequent reduction or broadcast operations as part of the allreduce process. The HW DS 222 ensures that intermediate results are efficiently shared within each tile and between tiles via D2D interconnects, facilitating seamless data exchange without needing to access external memory frequently.

In various implementations, chiplet device 200 is used to perform allreduce operations. The reduce-scatter operation within each module (e.g., module 110 and module 120 in FIG. 1) begins with sharing a first set of data among the chiplets in the first module via the D2D links. For example, D2D link 240 is used to share data with another chiplet for a reduce-scatter operation. The chiplets in the first module perform a first set of reduce-scatter operations on this data, combining partial results in each chiplet to gradually build an aggregated result across the module. A similar process occurs in the second module, where a second set of data is shared among the chiplets using the D2D links in the second module. The chiplets in the second module execute a second set of reduce-scatter operations, aggregating data within that module. These intra-module operations allow each module to handle its own data independently, reducing computational load and minimizing the need for inter-module communication at this stage.

Once the reduce-scatter operations are completed within each module, the system uses a PCIe link to enable communication between the first module and the second module. The PCIe link supports a third set of reduce-scatter operations across the two modules by facilitating the transfer of aggregated data between the first and second modules. For example, PCIe link 260 is used to exchange data with a chiplet configured on a different module for a reduce-scatter operation or an allgather operation. This inter-module reduce-scatter operation allows the system to further combine the partially aggregated results from each module, consolidating the data into a unified set of values across the entire chiplet device 201. Following this phase, the chiplets in both modules use the PCIe link to share a fourth set of data and perform an allgather operation. During the allgather phase, data is broadcast across both modules, ensuring that each chiplet has access to the final, fully aggregated dataset.

Within each module, the system can perform an additional allgather operation using the D2D links to further distribute aggregated data among the chiplets within a single module. This two-level hierarchical approach, using D2D links for intra-module communication and PCIe links for inter-module communication, enables a highly efficient allreduce operation that minimizes latency and optimizes bandwidth usage.

In various implementations, the modular configuration of chiplet device 201 is enhanced by implementing a multi-chip module (MCM) design 2, where each module can be packaged as a single MCM. The MCM structure allows the first plurality of chiplets in the first module and the second plurality of chiplets in the second module to be arranged in a fully connected mesh topology, which facilitates direct communication between all chiplets within a module through the D2D links, as illustrated in FIG. 2. To coordinate these operations, each module may be configured with a synchronization controller, which manages the timing for reduce-scatter and allgather operations.

Figure 3A:
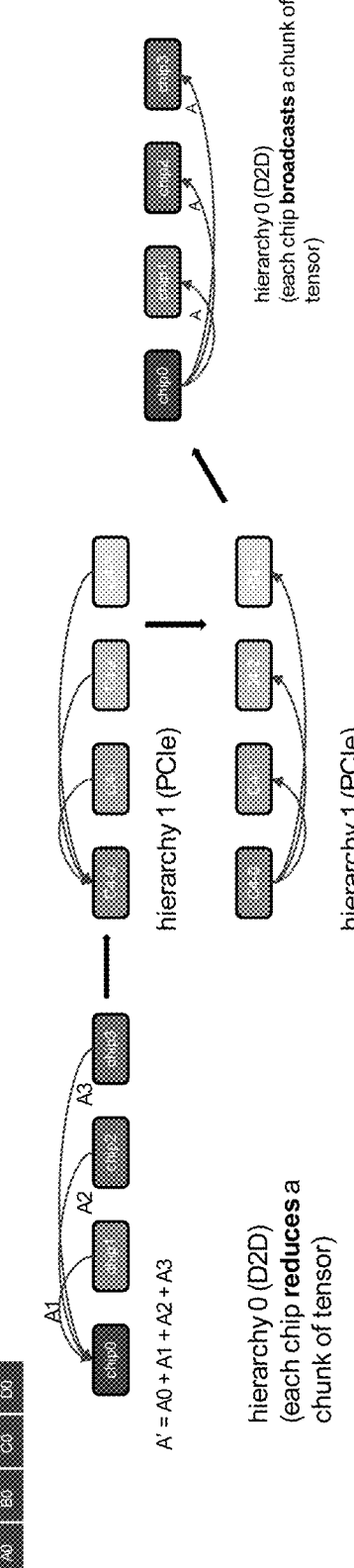
FIG. 3A is a simplified diagram illustrating an interleaving mechanism for allreduce operations according to embodiments of the present invention.

FIG. 3A is a simplified diagram illustrating an interleaving mechanism for allreduce operations according to embodiments of the present invention. This diagram is merely an example, which should not unduly limit the scope of the claims. One of ordinary skill in the art would recognize many variations, alternatives, and modifications. As an example, a hierarchy-based structure is optimized for efficient data aggregation, specifically for high-performance computing and AI workloads requiring collective operations, such as reduce-scatter and allgather. In this design, the first hierarchy level, referred to as Hierarchy 0 (e.g., linked by D2D), involves the initial stage of the reduce-scatter operation within each chip. In this stage, each chip (labeled as chip0, chip1, chip2, and chip3) receives a unique subset of the tensor data, labeled as A0, B0, C0, and D0, respectively. Each chip performs a local reduction operation on its assigned chunk of tensor data, generating a partial aggregated result (A1, A2, A3, etc.) that contributes to the overall reduction. This local reduction within each chip minimizes the amount of data that needs to be exchanged in subsequent stages, reducing bandwidth requirements at higher hierarchy levels.

Following the initial D2D-based reduction, the next stage is Hierarchy 1 (e.g., linked by PCIe), where partial results from each chip are further aggregated across different chip groups (represented by C4-0, C4-1, C4-2, and C4-3). This stage uses the PCIe link to facilitate inter-chip communication, allowing the partially reduced data from Hierarchy 0 to be combined into a single aggregated result. For example, the hierarchical structure enables the system to effectively perform the reduce-scatter operation by minimizing data movement and taking advantage of localized aggregation before performing broader data sharing across chip groups.

Once the reduce-scatter operation is complete, the system transitions into the allgather phase, as shown on the right side of FIG. 3. Here, the aggregated data is broadcast back to each chip through a similar hierarchical structure. In Hierarchy 1 (e.g., linked by PCIe), the data is distributed across the different chip groups (C4-0, C4-1, C4-2, and C4-3) using the PCIe link. Following this inter-chip distribution, Hierarchy 0 (e.g., linked by D2D) completes the allgather operation by broadcasting the necessary chunks of the tensor data to each chip within the group. As each chip completes its broadcast operation, every chip eventually has access to the full aggregated tensor data, which was initially divided among the chips.

It is to be appreciated that this mechanism for allreduce operations offers several advantages. By using D2D links for intra-chip aggregation and PCIe links for inter-chip communication, the system minimizes redundant data movement and maximizes bandwidth efficiency. Furthermore, the hierarchy structure enables effective precision scaling, where data precision can be reduced after the initial reduce-scatter operations, thereby conserving bandwidth during the allgather phase. This technique of reducing precision after local aggregation and before inter-chip communication optimizes the performance of allreduce operations, especially for large-scale tensor data commonly used in AI and ML applications.

Figure 3B:
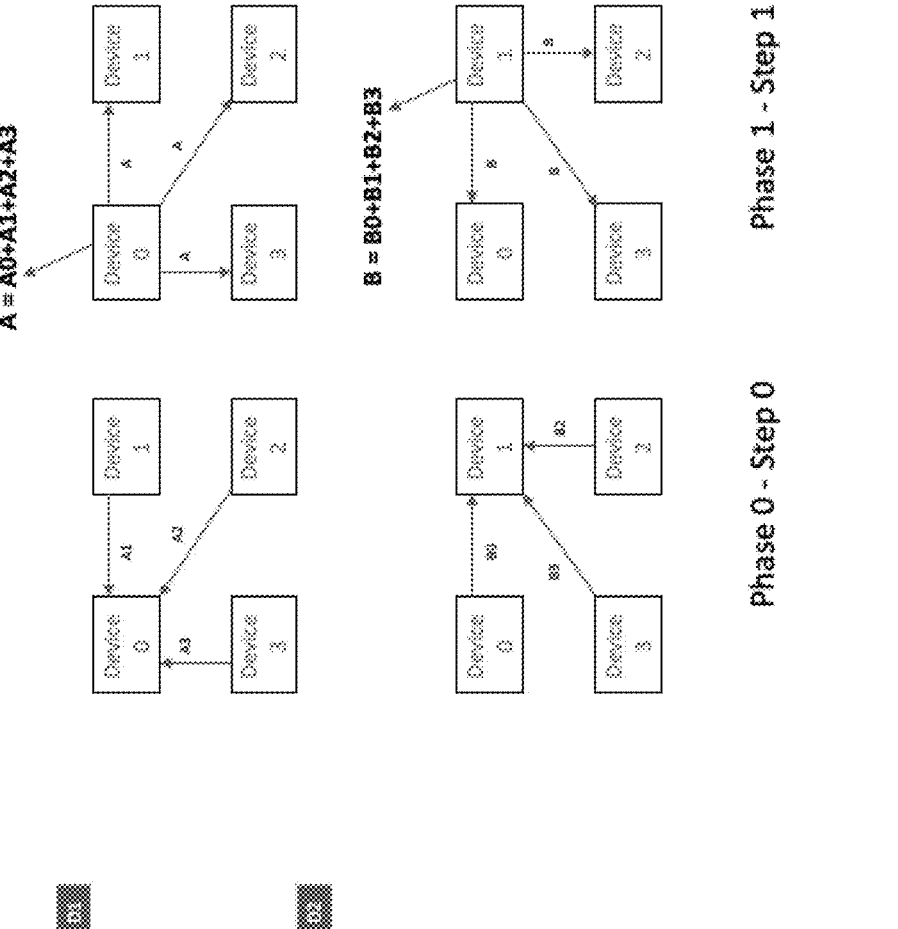
FIG. 3B is a simplified diagram illustrating an allreduce operation using a single hierarchy according to embodiments of the present invention.

FIG. 3B is a simplified diagram illustrating an allreduce operation using a single hierarchy according to embodiments of the present invention. This diagram is merely an example, which should not unduly limit the scope of the claims. One of ordinary skill in the art would recognize many variations, alternatives, and modifications. A system of fully connected chiplets (i.e., Devices 0, 1, 2, and 3) are configured to perform allReduce operations in a single-hierarchy configuration. The diagram outlines the sequential operations executed across the chiplets during reduce-scatter and allgather phases, essential for high-performance data aggregation in distributed computing environments such as machine learning inference. In this configuration, each chiplet (i.e., Devices 0 through 3) is interconnected through high-speed, low-latency links (e.g., D2D links), enabling direct communication between any pair of chiplets. This fully connected topology ensures efficient data movement with minimal communication overhead, which is particularly critical for processing small tensors.

In the reduce-scatter phase, each chiplet processes a portion of the input tensor data. For example, chiplet 0 (i.e., Device 0) starts with sub-tensors A0, B0, C0, and D0, while chiplet 1 (i.e., Device 1) begins with A1, B1, C1, and D1, and so forth for chiplets 2 and 3. In Step 0, the chiplets exchange specific sub-tensor data with one another. For instance, Device 0 aggregates A1, A2, and A3 from Devices 1, 2, and 3, respectively, combining them with A0 to compute A=A0+A1+A2+A3. Similarly, Device 1 computes the aggregate B=B0+B1+B2+B3. By the end of the reduce-scatter phase, each chiplet holds a partial result for a subset of the data, distributed based on the initial sub-tensor allocations.

In the allgather phase, the aggregated results from the reduce-scatter phase are redistributed across all chiplets to reconstruct the full tensor on each chiplet. For example, in Step 1, Device 0 transmits the aggregated result A to Devices 1, 2, and 3, while similarly receiving results B, C, and D from the other devices. Each chiplet now has access to the complete aggregated tensor [A, B, C, D], ensuring that all devices hold the final results.

Figure 4:
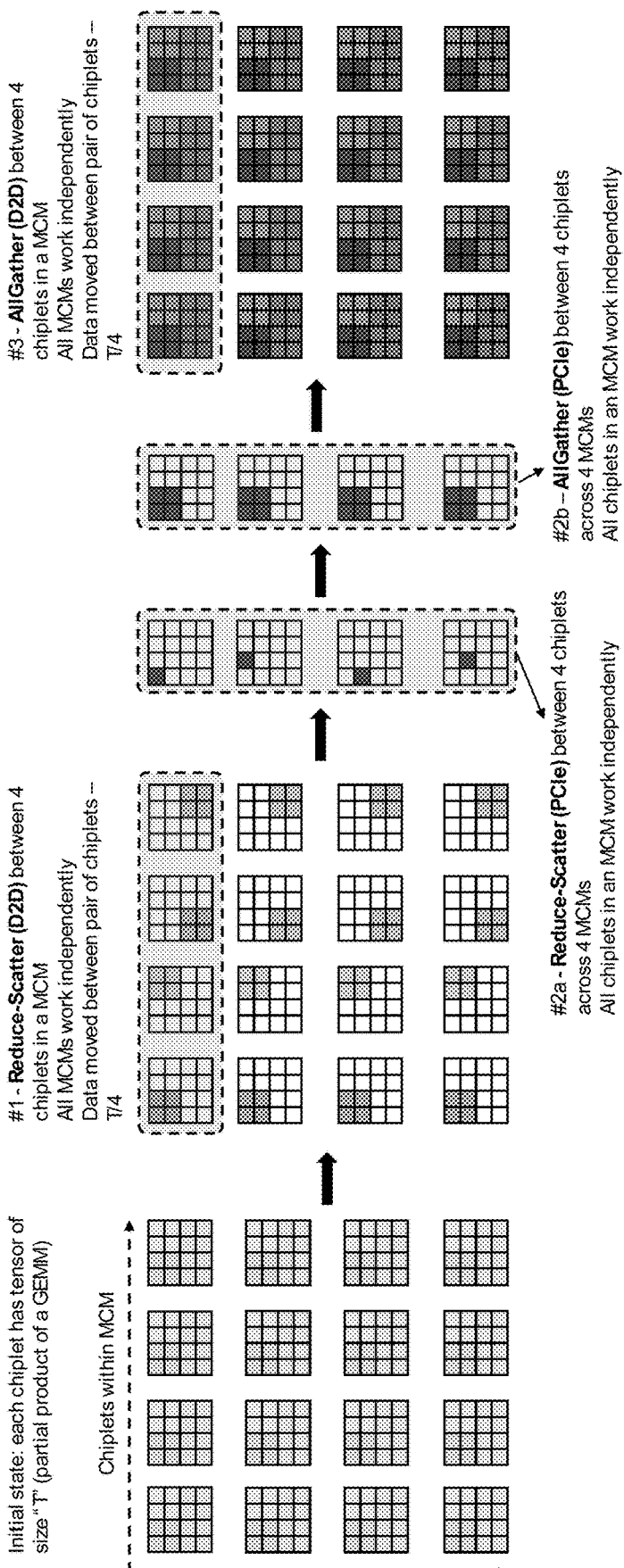
FIG. 4 is a simplified diagram illustrating an interleaving process accord hierarchies for performing allreduce operations according to embodiments of the present invention.

It is to be appreciated that the fully connected topology of the chiplets ensures that these operations are executed with minimal latency, as each chiplet communicates directly with its peers without the need for intermediary steps. This single-hierarchy approach eliminates redundant communication and minimizes data movement, optimizing the All-Reduce operation for small tensors. The direct connections between chiplets allow for high-bandwidth data exchanges, which are critical for distributed data processing tasks. This fully connected architecture is suited for small tensor workloads FIG. 4 is a simplified diagram illustrating an interleaving process accord hierarchies for performing allreduce operations according to embodiments of the present invention. This diagram is merely an example, which should not unduly limit the scope of the claims. One of ordinary skill in the art would recognize many variations, alternatives, and modifications.

Initial State. In the initial state, each chiplet within an MCM (such as those shown in FIG. 1) contains a tensor of data, labeled as size "T." For example, this tensor represents a partial result from a general matrix-matrix multiplication (GEMM) operation. The chiplets are grouped within MCMs, with each MCM containing four interconnected chiplets (e.g., Chiplet 111, Chiplet 112, Chiplet 113, and Chiplet 114 in FIG. 1). Within each MCM, these chiplets are connected by D2D links, which are specifically designed for high-bandwidth, low-latency data transfer as detailed in FIG. 2. This initial state sets up the tensor data chunks to be aggregated hierarchically.

Step #1: Intra-MCM Reduce-Scatter (D2D Links). The first phase, labeled as Step #1-Reduce-Scatter (D2D), involves a reduce-scatter operation performed within each MCM. Here, each of the four chiplets in an MCM reduces a chunk of the tensor data, aggregating partial results across the four chiplets within the module. For example, in the first module, data moves between Chiplets 111, 112, 113, and 114 via the D2D links (as shown in FIG. 1). Each chiplet contributes to the reduction of data chunks by summing or otherwise combining portions of the tensor in parallel, yielding a partially reduced result with data movement between pairs of chiplets.

The D2D links, which are characterized by their high-speed communication capabilities (at least 64 GB/s bandwidth as described in FIG. 2), facilitate this rapid intra-MCM data exchange. This reduce-scatter operation within each MCM enables a local aggregation of tensor data, resulting in an intermediate tensor of size T/4. By handling these reduce-scatter operations at the D2D level within each MCM, the architecture optimizes data locality and minimizes latency before moving to inter-MCM communication.

Step #2: Inter-MCM Reduce-Scatter (PCIe Links). Following the intra-MCM aggregation, the process moves to Step #2a-Reduce-Scatter (PCIe), which performs inter-MCM reduce-scatter operations across multiple MCMs using PCIe links. In this stage, each MCM acts as a single unit, and the reduced data from Step #1 (now size T/4) is shared across four MCMs. The PCIe links facilitate this data transfer between MCMs, allowing the partial results from each MCM to be further reduced.

The interconnect hierarchy leverages the PCIe links (as seen in FIG. 1 connection between MCMs) to perform the cross-MCM data movement required for this stage. Each PCIe link enables high-bandwidth data transfers across MCM boundaries, ensuring that partial results from the different MCMs contribute to the final aggregated result. At the end of Step #2a, each MCM has access to a portion of the final reduced data, with data size now reduced to T/16 for each pair of chiplets. This inter-MCM reduce-scatter operation optimally uses the PCIe interface to combine data across larger hardware units, ensuring that computation scales efficiently even as data volumes grow.

Step #3: Intra-MCM Allgather (D2D Links). After completing the reduce-scatter phases, the next phase, labeled Step #3-Allgather (D2D), begins with an allgather operation within each MCM. Here, the D2D links are used once again within each MCM to broadcast the reduced data chunks to all chiplets in the MCM. Each chiplet in an MCM receives a complete copy of the aggregated data produced in the previous steps.

In this intra-MCM broadcast stage, each chiplet communicates with others in its MCM (e.g., Chiplets 111-114 in MCM 110 as shown in FIG. 1) to distribute the combined results efficiently. By using D2D links, each MCM can independently perform the allgather operation, minimizing the need for inter-MCM communication and leveraging the high-speed, low-latency connections provided by D2D links for rapid data sharing.

Step #2b: Inter-MCM Allgather (PCIe Links). Following the intra-MCM allgather operation, an additional step labeled Step #2b-Allgather (PCIe) takes place, which involves inter-MCM allgather using PCIe links to complete the data sharing across all MCMs. In this stage, the aggregated data from each MCM is transmitted to other MCMs via PCIe, ensuring that each MCM has a full copy of the final aggregated tensor.

This inter-MCM allgather operation leverages the PCIe link between MCMs (as shown in FIGS. 1 and 2) to perform a broadcast of the final reduced data to all connected MCMs. The PCIe links enable this high-bandwidth communication, which is crucial for ensuring that all MCMs receive the final result. By completing this phase, each chiplet across all MCMs ultimately holds the full, aggregated tensor data, ready for further processing or storage.

It is to be appreciated that the mechanism illustrated in FIG. 4 leverages advantages of the chiplet-based architecture depicted in FIGS. 1 and 2. The initial data is reduced at the intra-MCM level through D2D links, followed by an inter-MCM reduce-scatter operation using PCIe links. The process then transitions into the allgather phase, where data is first broadcast within each MCM via D2D links, and finally across MCMs via PCIe links. Among other features, this design leverages D2D and PCIe interconnects to maximize efficiency in data movement, reduce latency, and optimize bandwidth usage. By conducting reduce-scatter operations in stages (first within MCMs, then across MCMs), and then completing the allgather operations similarly, the architecture achieves high performance for large-scale data aggregation tasks. This hierarchical structure is particularly suited for compute-intensive applications in AI and machine learning, where large tensor data needs to be aggregated and shared across multiple processing units.

Figure 5:
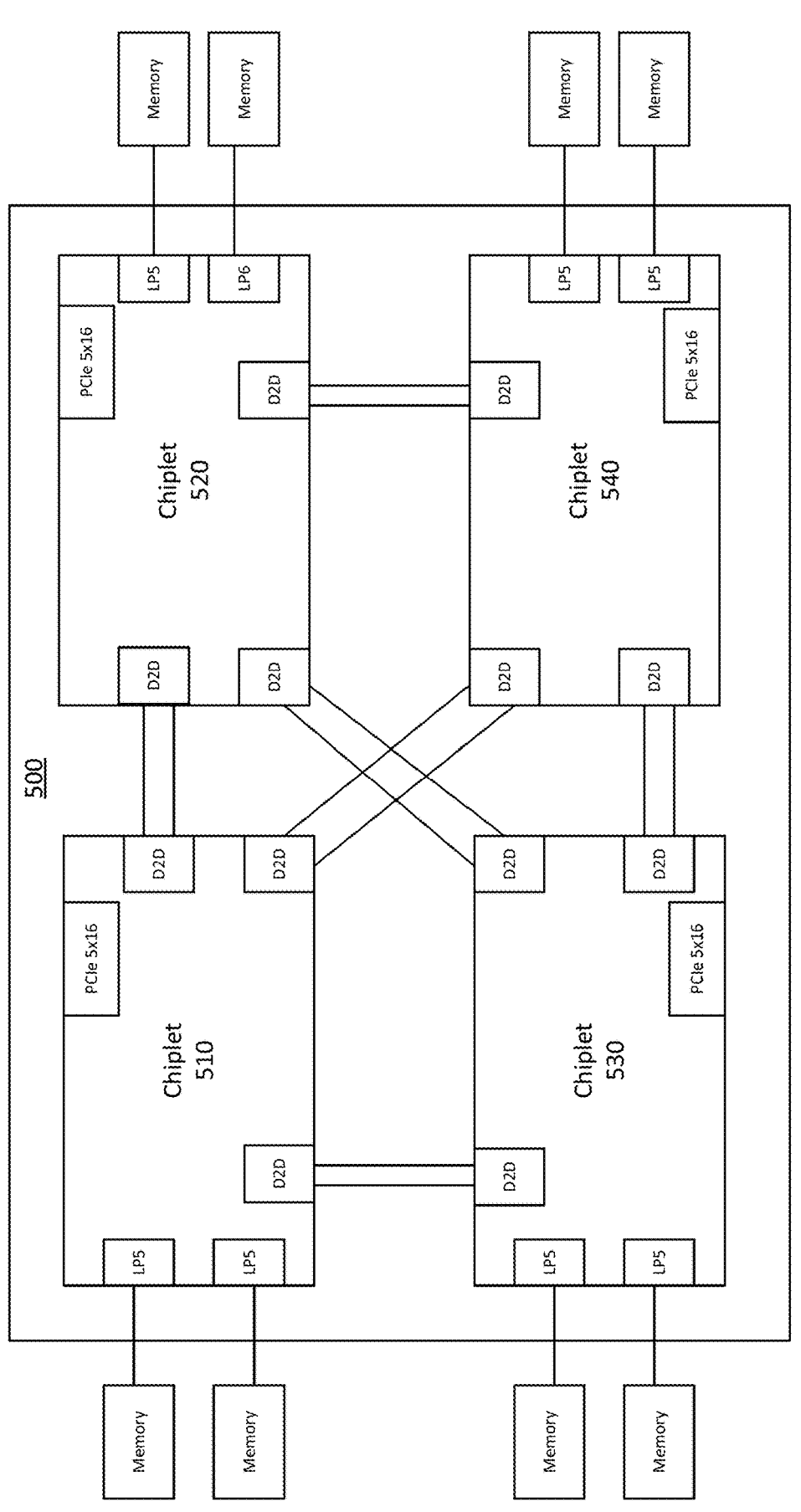
FIG. 5 is a simplified block diagram illustrating MGM 500 according to embodiments of the present invention.

FIG. 5 is a simplified block diagram illustrating MGM 500 according to embodiments of the present invention. This diagram is merely an example, which should not unduly limit the scope of the claims. One of ordinary skill in the art would recognize many variations, alternatives, and modifications. MGM 500 comprises four interconnected chiplets—Chiplet 510, Chiplet 520, Chiplet 530, and Chiplet 540—that form a fully connected topology through a combination of D2D links and PCIe links. For example, each chiplet is also connected to external memory modules via LP5 interfaces, providing the necessary bandwidth for data storage and retrieval during large-scale data processing.

In an embodiment, each chiplet within MGM 500 functions as an independent processing unit while supporting inter-chiplet data communication for allreduce operations. The D2D links interconnecting the chiplets facilitate high-speed, low-latency communication within the MGM 500. These D2D links enable rapid intra-MGM data exchange, supporting reduce-scatter and allgather operations within each chiplet cluster, which are essential steps in hierarchical allreduce processes.

In various embodiments, each chiplet in MGM 500 is also equipped with a PCIe 5x16 interface, which enables communication across chiplets and between separate MGM modules when scaling out to a multi-module architecture. This PCIe interconnect allows for inter-MGM communication during the reduce-scatter and allgather stages, supporting high-bandwidth, longer-distance data transfers compared to D2D links. The PCIe links are strategically configured to connect chiplets across different MGM modules, enabling data aggregation at a broader system level.

During allreduce operations, MGM 500 leverages both D2D and PCIe links to perform hierarchical data aggregation efficiently. The process begins with intra-chiplet reduce-scatter operations, where each chiplet independently processes a portion of data. Then, D2D links are used for local data aggregation within MGM 500, allowing partial results to be shared and combined across Chiplets 510, 520, 530, and 540. This stage of the reduce-scatter operation is conducted at a high precision level to ensure accuracy in the data aggregation phase.

After local reduce-scatter is completed within each MGM module, the PCIe links facilitate inter-module communication. Data from each chiplet is transmitted across PCIe links to other MGM modules, enabling a system-wide aggregation of data. The hierarchical structure ensures efficient use of resources, as the high-precision reduce-scatter operations are performed locally within each MGM module, while lower-precision data can be used in inter-module allgather operations to save bandwidth.

The MGM 500 architecture may be optimized for distributed data aggregation in AI and machine learning applications. The combination of high-bandwidth D2D links and PCIe connections minimizes latency and maximizes scalability. By using D2D links for local operations and PCIe for inter-module communication, MGM 500 efficiently handles allreduce tasks, reducing data movement overhead and improving overall performance in multi-chiplet and multi-module configurations.

Figure 6:
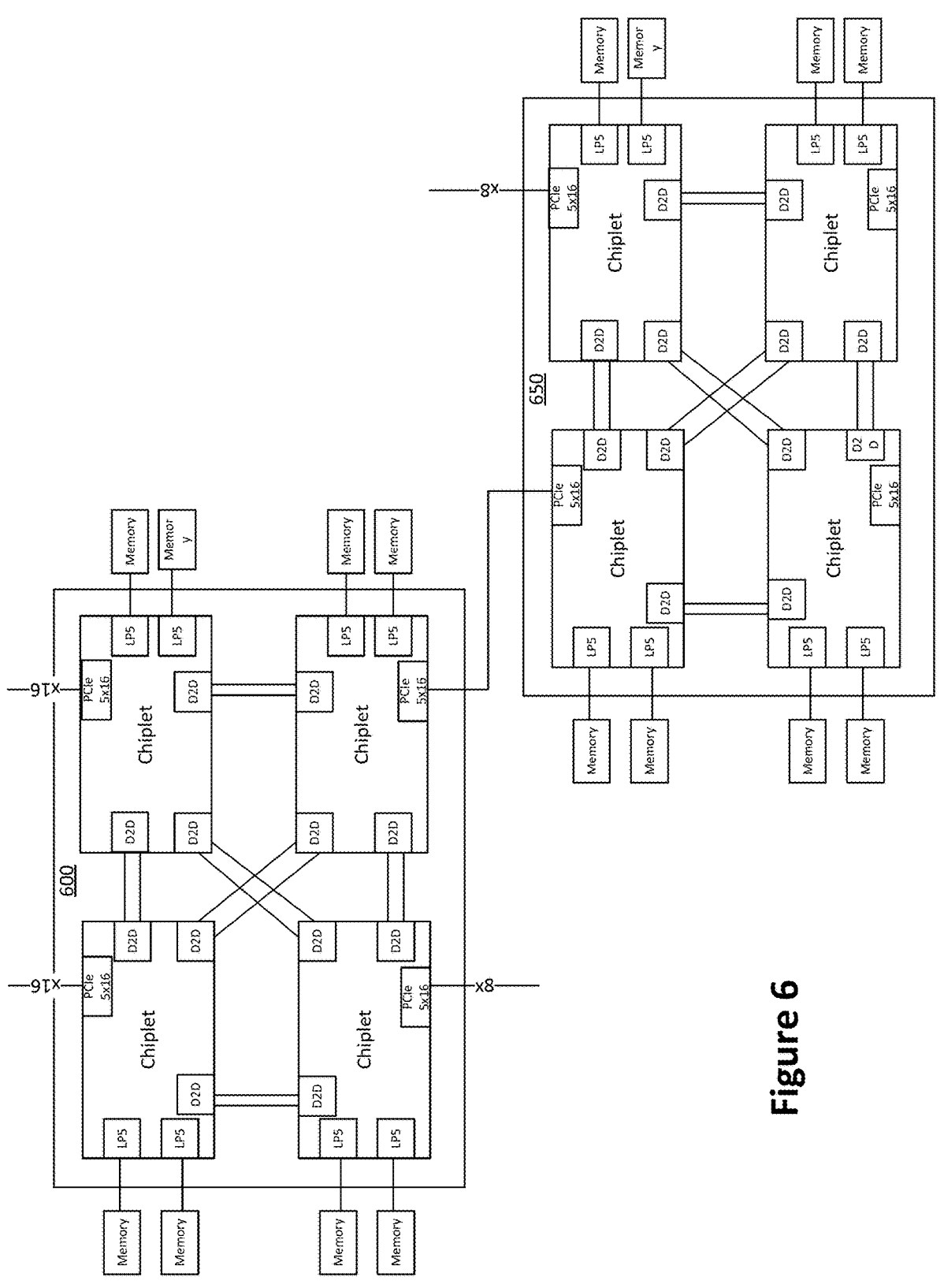
FIG. 6 is a simplified block diagram illustrating a system with two connected MGMs for performing allreduce operations according to embodiments of the present invention.

FIG. 6 is a simplified block diagram illustrating a system with two connected MGMs for performing allreduce operations according to embodiments of the present invention. This diagram is merely an example, which should not unduly limit the scope of the claims. One of ordinary skill in the art would recognize many variations, alternatives, and modifications.

For example, MGM 600 contains four chiplets connected via D2D links to allow high-speed, low-latency data transfer within the module. For example, the chiplets in each MGM are linked to external memory modules through LP5 interfaces, providing the necessary memory bandwidth for large-scale data storage and access. This configuration enables each MGM to independently perform local data aggregation before sharing results with other MGMs.

In various embodiments, each chiplet within MGM 600 and MGM 650 is also equipped with a PCIe 5x16 interface to support inter-module communication. The PCIe links enable data transfer between MGM 600 and MGM 650, facilitating inter-module reduce-scatter and allgather operations. This design allows each MGM to operate independently during intra-module aggregation, while the PCIe interfaces manage data exchange across MGMs, supporting the system-wide allreduce operation.

For example, an allreduce operation begins within each MGM, where the D2D links facilitate reduce-scatter operations across the chiplets. In MGM 600, for example, data is shared between its four chiplets over the D2D links, allowing each chiplet to aggregate a subset of data. Similarly, MGM 650 performs its own intra-module reduce-scatter operation using its D2D links. By performing this phase locally within each MGM, the system reduces the amount of data that needs to be shared between MGMs, conserving bandwidth and reducing latency.

Each D2D link is optimized for high-speed data transfer, ensuring that reduce-scatter operations within MGM 600 and MGM 650 can be conducted with minimal delay. The local aggregation enabled by the D2D links ensures that each MGM has partially aggregated results before initiating inter-module communication, maximizing efficiency at each level of the hierarchy.

After completing the intra-MGM reduce-scatter phase, the system performs an inter-MGM reduce-scatter operation using the PCIe links. The PCIe x16 interfaces enable data exchange between MGM 600 and MGM 650, allowing the partially aggregated data from each MGM to be further reduced across the modules. For example, data from each chiplet in MGM 600 can be transmitted to corresponding chiplets in MGM 650, and vice versa, using the PCIe links to combine the results from each module.

The use of PCIe links for inter-MGM reduce-scatter operations allows the system to handle larger-scale data aggregation by distributing the workload across multiple modules. This hierarchical approach, where each MGM first aggregates data locally and then exchanges results with other MGMs, optimizes both communication bandwidth and processing speed.

Following the reduce-scatter phase, the system transitions to the allgather phase to distribute the aggregated data back to all chiplets. This phase also follows a hierarchical approach. First, within each MGM, the D2D links enable local broadcasting of the aggregated data to all chiplets. In MGM 600, for instance, each chiplet can use the D2D links to share its data with the other chiplets in the module, ensuring that every chiplet in MGM 600 has a complete copy of the aggregated result. The same operation occurs within MGM 650 using its D2D links.

Once the intra-MGM allgather operation is complete, the system performs an inter-MGM allgather operation using the PCIe links to distribute the aggregated data across both modules. Data from MGM 600 is shared with MGM 650 and vice versa, allowing all chiplets in both MGMs to access the full result of the allreduce operation. This two-step broadcasting process minimizes the amount of data that needs to be transmitted over PCIe, leveraging the high-speed D2D links for local distribution and reserving PCIe bandwidth for cross-module communication.

It is to be appreciated that system illustrated in FIG. 6 provides many advantages. For example, the hierarchical structure of this system, with two MGMs connected via D2D and PCIe links, brings several key advantages for allreduce operations. By performing reduce-scatter and allgather operations locally within each MGM before cross-module communication, the system minimizes the latency associated with data transfers. The use of D2D links for intra-MGM operations allows high-speed data sharing within each module, while PCIe links handle inter-MGM communication, optimizing bandwidth usage at each level. This architecture may allow multiple MGMs to be connected in a similar manner, enabling scalability for larger data aggregation tasks in high-performance computing environments. The hierarchical allreduce operations are suited for the data-intensive requirements of AI and ML models, supporting efficient data aggregation and distribution across distributed processing units.

In various implementations, the present invention offers significant advancements in performing allreduce operations efficiently within a hierarchical, chiplet-based architecture. An exemplary design addresses the high latency and computational overhead associated with traditional methods of data aggregation, such as ring and binary tree-based algorithms, by introducing an efficient hierarchical one-hop tree structure. This approach may optimized for handling small tensor data, which is a common requirement in modern ML and AI applications, particularly in inference tasks.

For example, a one-hop tree structure in this disclosure enables each hierarchy to perform reduce-scatter and all-gather operations with minimal data movement, reducing the number of hops data must take to reach its destination. In traditional ring or binary tree algorithms, data often has to traverse multiple nodes (or "hops") in each operation, leading to increased latency and bandwidth overhead. In contrast, the one-hop Tree structure ensures that each processing unit communicates directly with its neighbors in a single hop at each hierarchical level, thereby drastically lowering latency. This direct communication model is advantageous for small tensors, where latency costs dominate over data transfer costs, making traditional multi-hop algorithms inefficient.

The hierarchical structure of the one-hop tree is divided into multiple levels, leveraging D2D links for intra-MCM communication and PCIe links for inter-MCM communication. This division allows the system to perform reduce-scatter and allgather operations in a staged manner, first locally within each MCM and then across multiple MCMs. By doing so, the invention minimizes data movement across the entire system, reducing latency and improving scalability. Each hierarchy operates independently, with efficient interleaving of phases (e.g., reduce-scatter and allgather), thereby avoiding redundant data transfers that are common in traditional algorithms.

An additional advantage of the present disclosure is the ability to apply precision scaling at different stages of the allreduce process. Specifically, the reduce-scatter phase, which requires higher precision to maintain accuracy during aggregation, is performed at a high precision level. However, once the data is partially aggregated, the precision can be lowered during the allgather phase to conserve bandwidth. This precision scaling approach optimizes bandwidth usage by reducing the size of data during inter-MCM communication without sacrificing the accuracy of the final aggregated result. This capability is particularly beneficial in resource-constrained environments where bandwidth is a limiting factor, allowing the system to handle larger data sets more efficiently.

It is to be appreciated that allreduce operations are important in distributed machine learning and inference tasks, especially in large-scale models used in generative AI. In these applications, allreduce can account for more than 50% of the total inference time, and in some cases, up to 90%. By drastically reducing the cost of allreduce operations, the present invention directly accelerates the execution of generative AI models, such as those used in NLP transformers and other large-scale inference tasks. This improvement means that generative inference models can run faster, with lower latency and reduced resource usage, making them more practical for deployment at scale.

In large-scale machine learning systems, particularly those executing inference across multiple processors, efficient data communication is crucial. The present invention's optimized allreduce algorithm significantly enhances the scale-out efficiency of ML inference tasks. By reducing the communication overhead associated with allreduce, this invention allows for expansion of ML models across multiple processing units, such as chiplets and MCMs. This capability is vital for modern inference tasks where models span numerous distributed devices, as it ensures that performance does not degrade as the system scales.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A system comprising:
a first module comprising a first plurality of chiplets;
a first plurality of die-to-die (D2D) links, the first plurality of chiplets being interconnected via the first plurality of D2D links, the first plurality of chiplets being configured to share a first set of data with each other using the first plurality of D2D links to perform a first set of reduce-scatter operations on the first set of data;
a second module comprising a second plurality of chiplets;
a second plurality of D2D links, the second plurality of chiplets being interconnected via the second plurality of D2D links, the second plurality of chiplets being configured to share a second set of data with each other using the second plurality of D2D links to perform a second set of reduce-scatter operations on the second set of data; and
a first peripheral component interconnect express (PCIe) link connecting the first module and the second module, the first plurality of chiplets and the second plurality of chiplets being configured to share a third set of data using the first PCIe link to perform a third set of reduce-scatter operations on the third set of data, the first plurality of chiplets and the second plurality of chiplets being configured to share a fourth set of data using the first PCIe link to perform a first set of allgather operations on the fourth set of data, the first plurality of chiplets further being configured to share a fifth set of data using the first plurality of D2D links to perform a second set of allgather operations on the fifth set of data after completion of the first set of reduce-scatter operations.

2. The system of claim 1, wherein the first module comprises a multi-chip module (MCM).

3. The system of claim 1, wherein the first plurality of chiplets comprises four chiplet, each chiplet being connected to the other three chiplets via D2D links.

4. The system of claim 1, further comprising a second PCIe link, wherein the first PCIe link connects a first chiplet of the first plurality of chiplets to a second chiplet of the second plurality of chiplets, and the second PCIe link connects a third chiplet of the first plurality of chiplets to a fourth chiplet of the fourth plurality of chiplets.

5. The system of claim 1, wherein the first module and the second module work independently for the first set of reduce-scatter operations and for the second set of reduce-scatter operations.

6. The system of claim 1, wherein the first module and the second module work independently for the first set of allgather operations.

7. The system of claim 1, wherein the first plurality of chiplets are configured in a fully connected mesh topology.

8. The system of claim 1, wherein the first modules comprise a synchronization controller configured to manage timing for reduce-scatter operations.

9. The system of claim 1, wherein each of the first plurality of D2D links comprises a bandwidth of at least 64 GB/s.

10. The system of claim 1, wherein the first set of reduce-scatter operations is performed at a first precision level, the first set of allgather operation is performed at a second precision level, and the first precision level being higher than the second precision level.

11. A method for performing allreduce operations, the method comprising:
configure a first module comprising a first plurality of chiplets, the first plurality of chiplets being interconnected via a first plurality of [D2D] die-to-die (D2D) links;
configure a second module, the second module comprising a second plurality of chiplets, the second plurality of chiplets being interconnected via a second plurality of D2D links;
sharing a first set of data among the first plurality of chiplets using the first plurality of D2D links;
performing a first set of reduce-scatter operations by the first plurality of chiplets using the first set of data;
sharing a second set of data between the first module and a second module via a PCIe link;
performing a second set of reduce-scatter operations by the first plurality of chiplets and the second plurality of chiplets using the second set of data;
sharing a third set of data between the first module and a second module via the PCIe link;
performing a first set of allgather operations by the first plurality of chiplets and the second plurality of chiplets using the third set of data; and
sharing a fourth set of data among the first plurality of chiplets using the first plurality of D2D links; and
performing a second set of allgather operations by the first plurality of chiplets using the fourth set of data after completion of the first set of reduce-scatter operations.

12. The method of claim 11, further comprising aligning the first set of reduce-scatter operations with the second set of reduce-scatter operations across the first module and the second modules.

13. The method of claim 11, further comprising performing a third set of reduce-scatter operations by the second module concurrently with the first set of reduce-scatter operations.

14. The method of claim 11, further comprising adjusting precision levels for reduce-scatter operations and allgather operations.

15. The method of claim 11, further comprising reducing a precision level after completing the second set of reduce-scatter operations.

16. The method of claim 11, wherein each chiplet is characterized by a tensor size T, the first set of data being characterized by a tensor size T/4 for the first set of scatter-reduce operations.

17. The method of claim 11, wherein each chiplet is characterized by a tensor size T, the second set of data being characterized by a tensor size T/16 for the second set of scatter-reduce operations.

18. The method of claim 11, wherein each chiplet is characterized by a tensor size T, the third set of data being characterized by a tensor size T/16 for the first set of allgather operations.

\* \* \* \* \*